(12) United States Patent
Kimura et al.

(10) Patent No.: US 8,399,555 B2
(45) Date of Patent: Mar. 19, 2013

(54) AQUEOUS COATING COMPOSITION AND PROCESS FOR ITS PRODUCTION, AND PROCESS FOR FORMING COATING FILM

(75) Inventors: Isao Kimura, Tokyo (JP); Naoko Sumi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/081,608

(22) Filed: Apr. 7, 2011

(65) Prior Publication Data

US 2011/0184116 A1    Jul. 28, 2011

Related U.S. Application Data

(63) Continuation of application No. PCT/JP2009/067503, filed on Oct. 7, 2009.

(30) Foreign Application Priority Data

Oct. 9, 2008  (JP) ................................. 2008-262776

(51) Int. Cl.
*C08L 53/00* (2006.01)
*C09J 7/02* (2006.01)

(52) U.S. Cl. .......... 524/505; 524/458; 524/544; 525/89; 525/90; 427/388.4

(58) Field of Classification Search .................. 524/544, 524/505, 458; 525/89, 90; 427/388.4
See application file for complete search history.

(56) References Cited

U.S. PATENT DOCUMENTS

| | | | | |
|---|---|---|---|---|
| 5,447,982 A * | 9/1995 | Kamba et al. | ................. | 524/458 |
| 2004/0019145 A1* | 1/2004 | Imoto et al. | ................. | 524/502 |
| 2009/0191419 A1* | 7/2009 | Yukawa et al. | ............... | 428/522 |
| 2009/0239993 A1* | 9/2009 | Sumi et al. | ................... | 524/544 |

FOREIGN PATENT DOCUMENTS

| | | |
|---|---|---|
| JP | 58-136605 | 8/1983 |
| JP | 06-65336 | 8/1994 |
| JP | 06-248225 | 9/1994 |
| JP | 07-53841 | 2/1995 |
| JP | 2007-262326 | 10/2007 |
| JP | 2009-179685 | 8/2009 |
| WO | 2007/125970 | 11/2007 |
| WO | WO2008013290 | * 1/2008 |
| WO | WO2008035779 | * 3/2008 |

OTHER PUBLICATIONS

Extended European Search Report issued Feb. 8, 2012, in Patent Application No. 09819222.2.
International Search Report issued Dec. 28, 2009 in PCT/JP09/067503 filed Dec. 18, 2009.

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

To provide an aqueous coating composition which has a high storage stability and which is capable of forming a coating film excellent in gloss, adhesion and water resistance; a process for its production; and a process for forming a coating film by using the aqueous coating composition.

An aqueous coating composition comprising a fluoro-olefin copolymer, a pigment, a copolymer (1) (an A-B type block copolymer which is a copolymer having no fluorine atoms or ionic groups and which comprises hydrophilic blocks (A) having repeating units (a) having a polyoxyethylene chain in the side chain, and hydrophobic blocks (B) having repeating units (b) having a hydrocarbon chain in the side chain) and an aqueous medium.

15 Claims, No Drawings

AQUEOUS COATING COMPOSITION AND PROCESS FOR ITS PRODUCTION, AND PROCESS FOR FORMING COATING FILM

TECHNICAL FIELD

The present invention relates to an aqueous coating composition containing a fluoro-olefin copolymer and a process for its production as well as a process for forming a coating film from such an aqueous coating composition.

BACKGROUND ART

Heretofore, as a coating material to present a coating film excellent in weather resistance, a coating material containing a fluororesin (fluororesin coating material) has been known. By virtue of its high weather resistance, the fluororesin coating material has been used as a top coating to be applied to the topmost surface of various substrates. As such a fluororesin to be used for a top coating, a solvent-soluble one is common which is soluble in an organic solvent such as xylene or cyclohexanone. The solvent-soluble fluororesin coating material has attracted attention as a coating material provided with both high durability and excellent ornamental design properties, whereby excellent glossy finish is possible. However, as compared with a common resin such as an acrylic resin or a polyester resin, the solvent-soluble type fluororesin coating material is inadequate in the pigment dispersibility. Therefore, usually, carboxy groups are introduced into a fluorinated copolymer to improve the pigment dispersibility of such a copolymer.

As a fluororesin for coating material having the pigment dispersibility improved, for example, a fluorinated polymer for coating material has been proposed wherein carboxy groups are introduced into the copolymer by reacting hydroxyl groups present in the copolymer with a dibasic acid (Patent Document 1). Further, as a pigment dispersion for fluororesin coating material having an improved dispersion stability or an improved gloss and mixed color stability of a dried coating film in the case of using it as a raw material for coating material, a pigment dispersion has been proposed which comprises a fluorinated copolymer containing a hydroxyalkyl crotonate monomer, a pigment, a pigment-dispersing agent and an organic solvent (Patent Document 2).

In recent years, for the protection of natural environment, global warming due to discharge of organic solvents and air pollution by e.g. photochemical smog have been regarded as problematic, and emission control has been implemented. Especially in Europe and U.S.A., such control is advanced, and also in Japan, Air Pollution Control Act was revised in 2006, and legal emission control has been initiated.

Therefore, in the field of coating materials, an aqueous coating composition has been developed which contains a synthetic resin and wherein only water or a mixture of water and a water-soluble organic solvent is used as a medium. As the synthetic resin to be dissolved and/or dispersed in the aqueous coating composition, various ones have now been proposed. As one of such synthetic resins, a fluorinated copolymer having carboxy groups bonded thereto is known.

Such an aqueous coating composition is used as a coating material by adding, as the case requires, a colorant such as a pigment, a plasticizer, an ultraviolet absorber, a leveling agent, an anti-cissing agent, an anti-skinning agent, a curing agent, etc.

In a case where a pigment is added to the aqueous coating composition, it is common that together with the pigment, a pigment dispersing agent is employed. In the aqueous coating material, the pigment-stabilizing mechanism is formed by electrostatic repulsion and steric hindrance by the pigment dispersing agent. Generally, the stabilizing degree due to the electrostatic repulsion is proportional to the thickness of electric double layer, and as a dispersing agent showing a strong electrostatic repulsion, a polycarboxylic acid or a polycarboxylate is known. For example, a case where a titanium oxide pigment is dispersed by using Nopcose 44-C (manufactured by SanNopco Limited, the structure is a polycarboxylic acid) as a dispersing agent, to an aqueous dispersion containing a fluorinated polymer having a hydrophilic moiety, obtained by emulsion polymerization (Patent Document 3). Further, a case where a titanium oxide pigment is dispersed by using Disrol H-14N dispersant (manufactured by Nippon Nyukazai Co., Ltd., the structure is a sodium polycarboxylate), to an aqueous coating composition containing a water soluble fluorinated polymer wherein at least some of carboxy groups in a fluorinated polymer having carboxy groups are neutralized by a basic compound (Patent Document 4).

PRIOR ART DOCUMENTS

Patent Documents

Patent Document 1: JP-A-58-136605
Patent Document 2: JP-A-6-248225
Patent Document 3: JP-A-6-65336
Patent Document 4: WO2007/125970

DISCLOSURE OF THE INVENTION

Problems to be Solved by the Invention

However, by a study made by the present inventors, the above-mentioned aqueous coating compositions are inadequate in the dispersion stability of the pigment or the fluorinated polymer. Therefore, even if their dispersion state is good immediately after the production, they have a problem in the storage stability such that agglomeration, etc. are likely to occur during the storage for a long period of time. In order to improve the storage stability, a large amount of a dispersing agent has to be added, whereby the performance such as the durability, water resistance or adhesion of the obtained coating film is likely to deteriorate.

The present invention has been made in view of the above circumstances, and it is an object of the present invention to provide an aqueous coating composition which has a high storage stability and which is capable of forming a coating film excellent in gloss, adhesion and water resistance; a process for its production; and a process for forming a coating film by using such an aqueous coating composition.

Means to Solve the Problems

The present inventors have conducted an extensive study and as a result, have found it possible to solve the above problems by using a specific copolymer as a pigment-dispersing agent, and the present invention has been accomplished on the basis of this discovery.

The present invention provides the following:

[1] An aqueous coating composition comprising a fluoro-olefin copolymer, a pigment, the following copolymer (1) and an aqueous medium:

Copolymer (1): an A-B type block copolymer which is a copolymer having no fluorine atoms or ionic groups and which comprises hydrophilic blocks (A) having repeating units (a) having a polyoxyethylene chain in the side chain, and hydrophobic blocks (B) having repeating units (b) having a hydrocarbon chain in the side chain.

[2] The aqueous coating composition according to [1], wherein the copolymer (1) contains, based on all repeating units, from 20 to 80 mol % of the repeating units (a) and from 80 to 20 mol % of the repeating units (b), and from 80 to 100 mol % of such repeating units (a) are present in the hydrophilic blocks (A).

[3] The aqueous coating composition according to [1] or [2], wherein the repeating units (a) have, in the side chain, —$(OC_2H_4)_n OR^1$ [wherein n is an integer of from 2 to 30, and $R^1$ is a hydrogen atom or a $C_{1-3}$ monovalent hydrocarbon group].

[4] The aqueous coating composition according to [3], wherein the repeating units (a) are polymerized units based on $CH_2=C(X)-Q^1-(OC_2H_4)_n OR^1$ [wherein n and $R^1$ are as defined above, X is a hydrogen atom or a methyl group, and $Q^1$ is a carbonyl group, —$COOR^3$— (provided that the carbonyl group in —$COOR^3$— is bonded to the carbon atom to which X is bonded, and $R^3$ is a $C_{3-6}$ alkylene group) or a single bond].

[5] The aqueous coating composition according to any one of [1] to [4], wherein the repeating units (b) are polymerized units based on $CH_2=C(X)-Q^2-R^2$ [wherein $R^2$ is a $C_{1-20}$ hydrocarbon group, X is a hydrogen atom or a methyl group, and $Q^2$ is —COO— (provided that the carbonyl group in —COO— is bonded to the carbon atom to which X is bonded), a single bond or an oxygen atom].

[6] The aqueous coating composition according to any one of [1] to [5], wherein the content of the copolymer (1) is from 2 to 20 parts by mass per 100 parts by mass of the pigment contained in the aqueous coating composition.

[7] The aqueous coating composition according to any one of [1] to [6], wherein the fluoro-olefin copolymer has an acid group which may form a salt.

[8] The aqueous coating composition according to [7], wherein the acid group is a carboxy group and/or a carboxylate group.

[9] The aqueous coating composition according to any one of [1] to [8], wherein the amount of an organic solvent is not higher than 1 mass % based on the total mass of the aqueous coating composition.

[10] The aqueous coating composition according to any one of [1] to [9], which contains no emulsifier.

[11] The aqueous coating composition according to any one of [1] to [10], which is for top coating.

[12] The aqueous coating composition according to any one of [1] to [11], wherein the content of the pigment is from 20 to 200 parts by mass per 100 parts by mass of the fluoro-olefin copolymer.

[13] The aqueous coating composition according to any one of [1] to [12], wherein the fluoro-olefin copolymer is a copolymer having the following units (f), the following units (g), the following units (h) and the following units (i):

Units (f): repeating units based on a fluoro-olefin,

Units (g): repeating units based on a vinyl monomer, an allyl monomer or an isopropenyl monomer and having, bonded thereto, carboxylate groups, some of which may be in the form of carboxy groups, Units (h): repeating units based on a vinyl monomer, an allyl monomer or an isopropenyl monomer and having, bonded thereto, no carboxy groups which may form hydroxy groups or salts, Units (i): repeating units based on a vinyl monomer having a hydroxy group bonded thereto, an allyl monomer having a hydroxy group bonded thereto or an isopropenyl monomer having a hydroxy group bonded thereto and having, bonded thereto, no carboxy groups which may form salts.

[14] A process for producing the aqueous coating composition as defined in any one of [1] to [13], which comprises a step of producing a fluoro-olefin copolymer aqueous dispersion by obtaining the fluoro-olefin copolymer by a solution polymerization using an organic solvent, and dissolving and/or dispersing the fluoro-olefin copolymer in an aqueous medium; a step of producing a pigment aqueous dispersion by dissolving and/or dispersing a pigment and the copolymer (1) in an aqueous medium; and a step of mixing the fluoro-olefin copolymer aqueous dispersion and the pigment aqueous dispersion.

[15] A process for forming a coating film, which comprises a step of blending the aqueous coating composition as defined in any one of [1] to [13] with a water-soluble or water-dispersible curing agent to obtain an aqueous coating material, and a step of applying the aqueous coating material to a surface of a substrate.

Advantageous Effects of the Invention

According to the present invention, it is possible to provide an aqueous coating composition which has a high storage stability and which is capable of forming a coating film having excellent properties; a process for its production; and a process for forming a coating film by using such an aqueous coating composition.

The aqueous coating composition of the present invention exhibits good storage stability even if a content of an emulsifier is very small or even if no emulsifier is present. Therefore, with the aqueous coating composition of the present invention, even after storage for a long period of time, the film forming property is good, and, when applied, it is possible to provide a coating film excellent in gloss, adhesion and water resistance.

Such effects are particularly distinct in a case where the aqueous coating composition is obtained by the process for producing an aqueous coating composition of the present invention.

BEST MODE FOR CARRYING OUT THE INVENTION

In this specification and claims, repeating units constituting a polymer may sometimes be referred to simply as "units".

The units in the present invention may be repeating units (polymerized units) formed directly by polymerization of a monomer, or units obtainable by further chemically modifying such polymerized units. An example of such chemical modification may, for example, be a method of reacting an acid group with a basic compound to form a group of a salt or a method of introducing a substituent to a functional group such as a hydroxy group (e.g. esterification).

Further, units represented by the formula (a) may be referred to as "units (a)". The same applies to compounds represented by other formulae, and for example, a monomer represented by the formula (b) may be represented by "a monomer (b)".

<<Aqueous Coating Composition>>
[Fluoro-Olefin Copolymer]

The fluoro-olefin copolymer is a copolymer comprising repeating units based on a fluoroolefin (hereinafter sometimes referred to as units (f)) and repeating units other than the units (f).

The "repeating units based on a fluoroolefin" are repeating units formed by polymerization of a fluoroolefin.

The repeating units based on a fluoroolefin are preferably the following units (f1):

$$—CFX^1—CX^2X^3— \quad (f1)$$

[In the formula (f1), each of $X^1$ and $X^2$ which are independent of each other, is a hydrogen atom, a chlorine atom or a fluorine atom, and $X^3$ is a chlorine atom, a fluorine atom or —$CY^1Y^2Y^3$ (wherein each of $Y^1$, $Y^2$ and $Y^3$ which are independent of one another, is a hydrogen atom, a chlorine atom or a fluorine atom.)]

Specific examples of the units (f) may be units formed by polymerization of the following monomers:

A fluoroethylene such as $CF_2=CF_2$, $CClF=CF_2$, $CHCl=CF_2$, $CCl_2=CF_2$, $CClF=CClF$, $CHF=CCl_2$, $CH_2=CClF$, $CCl_2=CClF$ or $CH_2=CF_2$.

A fluoropropene such as $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CH_3CCl=CHCl$, $CHF_2CCl=CCl_2$, $CF_2ClCH=CCl_2$, $CF_2ClCCl=CHCl$, $CCl_3CF=CHCl$ or $CF_3CF=CF_2$.

The units (f) are preferably units formed by polymerization of $CF_2=CF_2$ and/or units formed by polymerization of $CClF=CF_2$, since the weather resistance of the coating film will be thereby excellent.

The proportion of the units (f) in the fluoro-olefin copolymer is preferably from 40 to 60 mol %, more preferably from 45 to 55 mol %, based on the total (100 mol %) of all repeating units constituting the fluoro-olefin copolymer. When the proportion of the units (f) is within the above range, it is possible to obtain a coating film having good properties, for such reasons that sufficient weather resistance can be obtained, the glass transition temperature of the fluoro-olefin copolymer will not be too high, and the crystallinity will not appear.

The units (f) contained in the fluoro-olefin copolymer may be one type only, or two or more types.

Repeating units other than the units (f) to be contained in the fluoro-olefin copolymer are not particularly limited so long as they are repeating units based on a monomer polymerizable with a fluoroolefin. For example, they may suitably be selected among repeating units which are commonly used in fluoro-olefin copolymers to be used for conventional aqueous coating compositions. Such repeating units may, for example, be units (g) to (j) given hereinafter.

In the present invention, the fluoro-olefin copolymer preferably has an acid group which may form a salt. It is thereby possible to improve the dispersibility or solubility of the fluoro-olefin copolymer in an aqueous medium. Further, by blending a curing agent to such an aqueous coating composition for an aqueous coating material and forming a coating film by employing it, it is possible to form a coating film (cured film) excellent in gloss, hardness, water resistance and weather resistance.

Such an acid group may be one which is capable of forming a salt when reacted with a basic compound, and it is preferably a group selected from the group consisting of a carboxy group (—COOH), a sulfonic group (—$SO_2(OH)$) and a phosphonic group (—$PO(OH)_2$).

Such an acid group may form a salt.

Here, "an acid group forms a salt" means that the acid group is reacted with a basic compound to form an ionic bond. For example, a carboxy group in the form of a salt (a carboxylate group) is a group consisting of —COO— and a cation to form a salt with such —COO—.

Among acid groups of a fluoro-olefin copolymer, ones forming a salt may be some or all.

In the present invention, the acid groups of a fluoro-olefin copolymer are particularly preferably carboxy groups, of which some or all are in the form of a salt.

Among acid groups in a fluoro-olefin copolymer, the proportion of the acid groups which are in the form of a salt, is not particularly limited but is preferably from 30 to 100%, more preferably from 50 to 100%.

The fluoro-olefin copolymer preferably has an acid value of from 2 to 25 mgKOH/g, particularly preferably from 10 to 20 mgKOH/g. When the acid value is at least the lower limit value within the above range, the dispersion stability will be improved, and when it is at most the upper limit value, there will be a merit such that gelation of the copolymer is prevented. The acid value of the fluoro-olefin copolymer can be adjusted by adjusting the amount of the acid groups to be introduced into the fluoro-olefin copolymer.

The number average molecular weight (Mn) of the fluoro-olefin copolymer is preferably from 3,000 to 200,000, more preferably from 5,000 to 100,000. When the molecular weight is within such a range, there will be a merit such that the weather resistance of the coating film will be improved, the coating property will be improved and the outer appearance of the coating film will also be improved.

The molecular weight distribution (Mw/Mn) is preferably from 2.0 to 4.0, whereby there will be a merit such that the effects of the present invention can be sufficiently obtained, gelation can be particularly prevented, and the stability will be high. Mw represents a weight average molecular weight.

Mn and Mw are measured by gel permeation chromatography (GPC) using polystyrene as the standard.

The fluoro-olefin copolymer is preferably a copolymer essentially containing the above units (f), the following units (g), the following units (h) and the following units (i) (hereinafter referred to as a fluorinated copolymer (F)).

Units (g): repeating units based on a vinyl monomer, an allyl monomer or an isopropenyl monomer and having, bonded thereto, carboxylate groups, some of which may be in the form of carboxy groups.

Units (h): repeating units based on a vinyl monomer, an allyl monomer or an isopropenyl monomer and having, bonded thereto, no carboxy groups which may form hydroxy groups or salts.

Units (i): repeating units based on a vinyl monomer having a hydroxy group bonded thereto, an allyl monomer having a hydroxy group bonded thereto or an isopropenyl monomer having a hydroxy group bonded thereto and having, bonded thereto, no carboxy groups which may form salts.

The fluorinated copolymer (F) may be a copolymer composed solely of the units (f), (g), (h) and (i), or may be a copolymer containing other units (units (j)) in addition to these units (f) to (i).

Here, "repeating units based on a vinyl monomer or an allyl monomer" are repeating units formed by polymerization of a vinyl monomer or an allyl monomer.

The "vinyl monomer" may, for example, be a vinyl ether monomer such as an alkyl vinyl ether or a cycloalkyl vinyl ether; or a vinyl ester monomer such as an alkyl vinyl ester or a cycloalkyl vinyl ester. The vinyl monomer in the units (g) to (i) is preferably a vinyl ether monomer.

The "allyl monomer" may, for example, be an allyl ether monomer such as an alkyl allyl ether or a cycloalkyl allyl ether; or an allyl ester monomer such as an alkyl allyl ester or a cycloalkyl allyl ester. The allyl monomer in the units (g) to (i) is preferably an allyl ether monomer.

The "isopropenyl monomer" may, for example, be an isopropenyl ether monomer such as an alkyl isopropenyl ether or a cycloalkyl isopropenyl ether; or an isopropenyl ester monomer such as an alkyl isopropenyl ester or a cycloalkyl isopropenyl ester. The isopropenyl monomer in the units (g) to (i) is preferably an isopropenyl ether monomer.

The proportion of the units (f) in the fluorinated copolymer (F) is preferably from 40 to 60 mol %, more preferably from 45 to 55 mol %, based on the total (100 mol %) of all repeating units constituting the fluorinated copolymer (F). When the proportion of the units (f) is within the above range, it is possible to obtain a coating film having good properties, for such reasons that sufficient weather resistance can be obtained, the glass transition temperature of the fluorinated copolymer will not be too high, and the crystallinity will not appear.

The units (f) contained in the fluorinated copolymer (F) may be one type only, or two or more types.

In the units (g), the carboxylate groups are groups wherein a carboxy group (—COOH) forms an ionic bond with a base, and they are preferably groups of a quaternary ammonium salt of a carboxy group.

The units (g) may, for example, be units formed by polymerization of a vinyl monomer having a carboxy group bonded thereto or an allyl monomer having a carboxy group bonded thereto, wherein some or all of the carboxy groups are in the form of salts; or units formed by polymerization of a vinyl monomer having, bonded thereto, a carboxylate group which may partly be a carboxy group, or an allyl monomer having, bonded thereto, a carboxylate group which may partly be a carboxy group.

Such units are preferably units formed by polymerization of a terminal unsaturated carboxylic acid, wherein some or all of carboxy groups in the units are formed into salts; or units formed by polymerization of a compound wherein some or all of carboxy groups in a terminal unsaturated carboxylic acid are formed into salts.

The terminal unsaturated carboxylic acid may, for example, be 3-butenoic acid, 4-pentenoic acid, 2-hexenoic acid, 3-hexenoic acid, 5-hexenoic acid, 2-heptenoic acid, 3-heptenoic acid, 6-heptenoic acid, 3-octenoic acid, 7-octenoic acid, 2-nonenoic acid, 3-nonenoic acid, 8-nonenoic acid, 9-decenoic acid, 10-undecenoic acid, 3-allyloxypropionic acid, allyloxyvaleric acid, monovinyl adipate, vinyl crotonate, monovinyl succinate or maleic acid. Among them, 10-undecenoic acid or 3-allyloxypropionic acid is preferred from the viewpoint of availability and copolymerizability.

Otherwise, the units (g) may be ones having acid groups introduced after the polymerization, as shown in the method (I-2) which will be described hereinafter. For example, they may be ones subjected to chemical modification treatment such that acid groups are introduced into the hydroxy groups of units (i) by acid modification.

The units (g) are preferably the following units (g1):

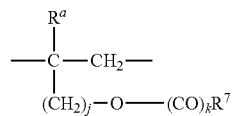

[in the formula (g1), $R^c$ is a hydrogen atom or a methyl group, $R^d$ is a hydrogen atom or a methyl group, —COOR$^4$ (wherein $R^4$ is a hydrogen atom and/or a salt group) is a carbon/late group which may partly be a carboxy group, $R^e$ is a hydrogen atom or —COOR$^4$, each of p, r, q, s, t, u and v which are independent of one another, is 0 or 1, and each of $R^5$ and $R^6$ which are independent of each other, is a $C_{1-15}$ alkylene group or a $C_{4-10}$ bivalent alicyclic hydrocarbon group.]

The number of carbon atoms in the alkyl group for $R^5$ and $R^6$ is preferably from 2 to 10.

The bivalent alicyclic hydrocarbon group for $R^5$ and $R^6$ is preferably a cycloalkylene group.

The proportion of the units (g) in the fluorinated copolymer (F) is preferably from 0.4 to 5 mol %, more preferably from 2 to 4 mol %, based on the total (100 mol %) of all repeating units constituting the fluorinated copolymer (F). When the proportion of the units (g) is within the above range, the dispersibility of the fluorinated copolymer (F) and the stability of the obtainable aqueous coating composition will be improved. Further, the water resistance and water permeability of the coating film formed from the fluorinated copolymer (F) will be remarkably improved.

The units (g) contained in the fluorinated copolymer (F) may be one type only or two or more types.

The units (h) may be units formed by polymerization of a vinyl ether having, bonded thereto, no carboxy group which may form a hydroxy group or a salt, or an allyl ether having, bonded thereto, no carboxy group which may form a hydroxy group or a salt.

The units (h) are preferably the following units (h1):

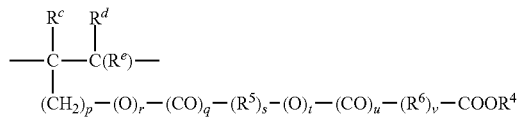

[in the formula (h1), $R^a$ is a hydrogen atom or a methyl group, $R^7$ is a $C_{1-12}$ alkyl group or a $C_{4-10}$ monovalent alicyclic hydrocarbon group, j is 0 or 1, and k is 0 or 1.]

The number of carbon atoms in the alkyl group for $R^7$ is preferably from 1 to 6.

The monovalent alicyclic hydrocarbon group for $R^7$ is preferably a cycloalkylene group.

Specific examples of the units (h) may be units obtained by polymerizing monomers such as ethyl vinyl ether, n-butyl vinyl ether, cyclohexyl vinyl ether, vinyl acetate, vinyl valerate and vinyl pivalate. Among them, units suitable for the desired coating film properties (such as hardness, gloss and pigment dispersibility) may suitably be selected.

The units (h) are particularly preferably units obtained by polymerizing ethyl vinyl ether and/or units obtained by polymerizing cyclohexyl vinyl ether, whereby the mutual copolymerizability with other monomers will be good, and the glass transition temperature of the copolymer can easily be adjusted.

The proportion of the units (h) in the fluorinated copolymer (F) is preferably from 3 to 50 mol %, more preferably from 20 to 40 mol %, based on the total (100 mol %) of all repeating units constituting the fluorinated copolymer (F). When the proportion of the units (h) is within the above range, there is a merit such that when formed into a coating film, transparency and gloss will be further improved.

The units (h) contained in the fluorinated copolymer (F) may be one type only or two or more types.

The units (i) may be units formed by polymerization of a hydroxy group-containing vinyl ether, a hydroxy group-containing vinyl ester, a hydroxy group-containing allyl ether or a hydroxy group-containing allyl ester.

The units (i) are preferably the following units (i1):

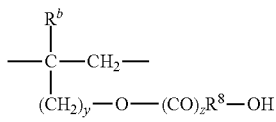

(i1)

[in the formula (i1), $R^b$ is a hydrogen atom or a methyl group, $R^8$ is a $C_{1-10}$ alkylene group or a $C_{4-10}$ bivalent alicyclic hydrocarbon group, y is 0 or 1, and z is 0 or 1.]

The number of carbon atoms in the alkylene group for $R^8$ is preferably from 2 to 10.

The bivalent alicyclic hydrocarbon group for $R^8$ is preferably a cycloalkylene group.

The units (i) are preferably units formed by polymerization of 2-hydroxyethyl vinyl ether, 4-hydroxybutyl vinyl ether, 1-hydroxymethyl-4-vinyloxymethylcyclohexane or 4-hydroxybutyl vinyl ester. From the viewpoint of the polymerizability, cross-linking property, etc., units formed by polymerization of a hydroxyalkyl vinyl ether are particularly preferred.

The proportion of the units (i) in the fluorinated copolymer (F) is preferably from 4 to 30 mol %, more preferably from 8 to 25 mol %, based on the total (100 mol %) of all repeating units constituting the fluorinated copolymer (F). When the proportion of the units (i) is within the above range, there is a merit such that when a coating film is formed by blending a curing agent, the cross-linking density will be high, and the water resistance will be improved.

The units (i) contained in the fluorinated copolymer (F) may be one type only or two or more types.

The units (j) do not belong to any one of the above units (f) to (i) and may be repeating units of a monomer which is copolymerizable with the monomers leading to such units. For example, units formed by polymerization of ethylene may be exemplified.

In a case where the fluorinated copolymer (F) contains units (j), the proportion of the units (j) in the fluorinated copolymer (F) is preferably more than 0 to 20 mol % based on the total (100 mol %) of all repeating units constituting the fluorinated copolymer (F).

The units (j) contained in the fluorinated copolymer (F) may be one type only or two or more types.

The fluorinated copolymer (F) is particularly preferably a copolymer comprising units (f) to (i). Especially preferred is a copolymer comprising from 45 to 55 mol % of the units (f), at least 0.4 mol % and less than 5 mol % of the units (g), from 14 to 45.6 mol % of the units (h) and from 8 to 25 mol % of the units (i). Further, the proportion of the units (g) in the copolymer is particularly preferably from 2 to 4 mol %.

The fluoro-olefin copolymer such as the above fluorinated copolymer (F) may be a commercial product, such as one commercially available for an aqueous coating material, or may be synthesized by a known production method.

In the present invention, the fluoro-olefin copolymer is preferably incorporated in the state of an aqueous dispersion to the aqueous coating composition. As the method for producing an aqueous dispersion of the fluoro-olefin copolymer, a production method by means of an emulsion polymerization method (e.g. the above-mentioned Patent Document 3), or a production method by means of water phase inversion of a fluoro-olefin copolymer obtained by a solution polymerization method (e.g. above-mentioned Patent Document 4) is known.

In the present invention, it is preferred to employ a fluoro-olefin copolymer obtained by a solution polymerization method using an organic solvent. It is particularly preferred to employ an aqueous dispersion obtained by water phase inversion of a fluoro-olefin copolymer.

The method for producing the fluoro-olefin copolymer by emulsion polymerization is efficient in the preparation of an aqueous coating composition, whereby the stability of the aqueous coating composition of the obtained copolymer is high. However, by a study made by the present inventors, the coating film obtained by using such an aqueous coating composition has had a problem that it is inadequate in toughness, water resistance and adhesion property. The fluoroolefin copolymer obtained by an emulsion polymerization method has a high molecular weight and is in the form of emulsion particles, and it is considered that when it is made into a coating material by adding a curing agent, the cross-linking reaction with the curing agent tends to hardly proceed quantitatively, and it is difficult to obtain a uniform cross-linked structure.

Further, by the emulsifier remaining on the coating film, the water repellency tends to deteriorate, thus adversely affecting the coating film properties.

On the other hand, a fluoro-olefin copolymer obtained by a solution polymerization method has a low molecular weight as compared with the fluoro-olefin copolymer obtained by the emulsion polymerization method, and it is considered that when it is formed into a coating material by adding a curing agent, it is readily reactive with the curing agent quantitatively. Therefore, in a case where a fluoro-olefin copolymer obtained by a solution polymerization method is used, it is considered that particles of the fluoro-olefin copolymer are likely to uniformly cross-link with one another to form a uniform coating film. Further, such an aqueous dispersion has a merit that it contains no emulsifier.

However, an ionic pigment dispersing agent, a low molecular weight nonionic pigment dispersing agent or a random copolymer-type pigment dispersing agent which has been heretofore used for an aqueous coating composition, is inadequate in the pigment-dispersing performance in the co-existence of an aqueous dispersion of a fluoro-olefin copolymer obtained by a solution polymerization method. Therefore, an aqueous coating composition having such a pigment-dispersing agent incorporated is inadequate in the practical storage stability in that during the storage, aggregation, precipitation, etc. of the pigment and the fluoro-olefin copolymer are likely to occur.

Whereas, the copolymer (1) to be used in the present invention exhibits a high pigment-dispersing performance in the co-existence of an aqueous dispersion of a fluoro-olefin copolymer obtained by a solution polymerization method. Therefore, the aqueous coating composition of the present invention wherein the copolymer (1) is used as a pigment-dispersing agent, has a good storage stability even in a case where an aqueous dispersion of a fluoro-olefin copolymer obtainable by solution polymerization method employing an organic solvent, is used. Such an aqueous coating composition is excellent also in properties such as gloss, durability, water resistance, adhesion, appearance, etc.

The method for producing a fluoro-olefin copolymer by a solution polymerization method employing an organic solvent and its aqueous dispersion, will be described in detail in the section for the process for producing an aqueous coating composition of the present invention given hereinafter.

[Pigment]

The pigment is not particularly limited so long as it is a pigment which is soluble and/or dispersible in the coating composition, and a coloring pigment, a luster pigment or a heat shielding pigment may, for example, be used. It may be an organic pigment or an inorganic pigment.

The coloring pigment may, for example, be a white pigment such as titanium oxide; a black pigment such as carbon black, acetylene black, lamp black, born black, graphite, iron black or aniline black; a yellow pigment such as yellow iron oxide, titanium yellow, monoazo yellow, condensed azo yellow, azomethine yellow, bismuth banadate, benzimidazolone, isoindolinone, isoindoline, quinophthalone, benzidine yellow or permanent yellow; an orange pigment such as permanent orange; a red pigment such as red iron oxide, naphthol AS type azo red, anthranthrone, anthraquinole red, perylene maroon, quinacridone type red pigment, diketopyrrolopyrrole, watching red or permanent red; a violet pigment such as cobalt violet, quinacridone violet or dioxadine violet; a blue pigment such as cobalt blue, phthalocyanine blue or threne blue; or a green pigment such as phthalocyanine green.

The luster pigment may, for example, be a metallic pigment such as aluminum powder, bronze powder, copper powder, tin powder, iron phosphide or zinc powder; a pearly luster pigment such as metal oxide-coating mica powder or mica-form iron oxide; or an extender pigment such as baryta powder, precipitated barium sulfate, barium carbonate, calcium carbonate, gypsum, clay, white carbon, diatomaceous earth, talc, magnesium carbonate, alumina white or gloss white.

The heat shielding pigment may, for example, be a white pigment having an average particle size within a range of from 300 to 2,000 nm, or a perylene type black pigment.

Among them, in the present invention, it is preferred to employ titanium oxide as the pigment, whereby particularly excellent effects can be obtained with respect to the coloring property, shielding property, weather resistance, etc.

The pigment may be one which is preliminarily treated for suppressing a photocatalytic action, for example, by covering the surface with e.g. silica, alumina, zirconia or cerium oxide, as the case requires.

In the aqueous coating composition of the present invention, the proportion of the pigment (the pigment concentration) is preferably from 1 to 70 mass %, more preferably from 2 to 50 mass %, based on the total amount of the fluoro-olefin copolymer, the after-mentioned other synthetic resins when such other synthetic resins are contained, and the pigment in the aqueous coating composition, from the viewpoint of the antifouling property, the coating film surface gloss, the finishing property, the coating film strength, etc.

Further, the aqueous coating composition of the present invention preferably contains the pigment in an amount of from 20 to 200 parts by mass, particularly preferably from 30 to 150 parts by mass, per 100 parts by mass of the solid content of the fluoro-olefin copolymer.

[Copolymer (1)]

The copolymer (1) is an A-B type block copolymer which is a copolymer having no fluorine atoms or ionic groups and which comprises hydrophilic blocks (A) having repeating units (a) having a polyoxyethylene chain in the side chain, and hydrophobic blocks (B) having repeating units (b) having a hydrocarbon chain in the side chain.

Here, the "A-B block copolymer" represents a block copolymer having a structure wherein one end of one hydrophilic block (A) is bonded to one end of one hydrophobic block (B).

The "ionic group" is a group which is ionized in water to form a cation or anion.

The copolymer (1) is an A-B type block copolymer and has no fluorine atoms or ionic groups, and thus it has a high dispersing performance whereby the dispersed state of the fluoro-olefin copolymer and the pigment in the aqueous medium can be maintained for a long period of time.

The "hydrophilicity" and "hydrophobicity" in the hydrophilic blocks (A) and hydrophobic blocks (B) are relatively determined. In the copolymer (1), blocks having repeating units (a) and having a relatively high hydrophilicity are hydrophilic blocks (A), and blocks having repeating units (b) and having a relatively high hydrophobicity are hydrophobic blocks (B).

In the present invention, the hydrophilic blocks (A) in the copolymer (1) are preferably blocks wherein from 80 to 100 mol %, more preferably from 90 to 100 mol %, of all repeating units (a) contained in the copolymer (1) are present.

Particularly, the hydrophilic blocks (A) are preferably blocks wherein all repeating units (a) contained in the copolymer (1) are present. That is, the hydrophobic blocks (B) are preferably blocks containing no repeating units (a).

Further, the hydrophobic blocks (B) are preferably blocks containing no repeating units (a) and comprising at least one type of repeating units (b) having a hydrocarbon group in the side chain.

The repeating units (a) are repeating units having a polyoxyethylene chain in the side chain.

The number of oxyethylene groups ($-OC_2H_4-$) constituting the polyoxyethylene chain may be 2 or more. From the viewpoint of the dispersibility in an aqueous medium, it is preferably from 2 to 30, more preferably from 5 to 20.

The repeating units (a) are particularly preferably ones having, in the side chain, $-(OC_2H_4)_nOR^1$ [wherein n is an integer of from 2 to 30, and $R^1$ is a hydrogen atom or a $C_{1-3}$ monovalent hydrocarbon group].

In the formula, n is preferably an integer of from 5 to 20.

The hydrocarbon group for $R^1$ is preferably a saturated hydrocarbon group (alkyl group), and specifically, a methyl group, an ethyl group, a n-propyl group or an isopropyl group may be mentioned.

$R^1$ is preferably a hydrogen atom, a methyl group or an ethyl group, most preferably a hydrogen atom.

The structure of the repeating units (a) is not particularly limited so long as they are ones having the above polyoxyethylene chain in the side chain.

Particularly preferred are polymerized units based on a polymerizable monomer having one $-(OC_2H_4)_nOR^1$ and one polymerizable unsaturated group.

The polymerizable unsaturated group may be one whereby the polymerizable monomer becomes polymerizable alone or together with the repeating units (a) with a monomer leading to other units to constitute hydrophilic blocks (A) or hydrophobic blocks (B), and it may, for example, be an ethylenic unsaturated group such as a vinyl group, an allyl group or a (meth)acryloyl group; or an isopropenyl group. Among them, an ethylenic unsaturated group is preferred.

The repeating units (a) are preferably polymerized units based on $CH_2=C(X)-Q^1-(OC_2H_4)_nOR^1$ [wherein n and $R^1$ are as defined above, X is a hydrogen atom or a methyl group, and $Q^1$ is a carbonyl group, $-COOR^3-$ (provided that the carbonyl group in $-COOR^3-$ is bonded to the carbon atom to which X is bonded, and $R^3$ is a $C_{3-6}$ alkylene group) or a single bond].

$R^3$ may be linear or branched, but is preferably a linear alkylene group, and a trimethylene group or a tetramethylene group is preferred.

The repeating units (a) contained in the copolymer (1) may be one type alone, or two or more types.

The repeating units (a) may be present not only in the hydrophilic blocks (A) but also in the hydrophobic blocks (B). However, for the advantageous effects of the present invention, among all repeating units (a) contained in the copolymer (1), from 80 to 100 mol % is preferably present in the hydrophilic blocks (A), from 90 to 100 mol % is more preferably present in the hydrophilic blocks (A), and all repeating units (a) (100 mol %) are most preferably present in the hydrophilic blocks (A). That is, it is most preferred that the hydrophobic blocks (B) contains no repeating units (a).

The repeating units (b) are repeating units having a hydrocarbon group in the side chain.

The hydrocarbon group is preferably a monovalent hydrocarbon group, and the number of carbon atoms therein is preferably from 1 to 20, more preferably from 2 to 20, further preferably from 3 to 16.

The hydrocarbon group may be an aliphatic hydrocarbon group or an aromatic hydrocarbon group.

The aliphatic hydrocarbon group may be a monovalent linear, branched or alicyclic hydrocarbon group. The aliphatic hydrocarbon group may be a saturated hydrocarbon group (alkyl group), or unsaturated, and it is preferably a saturated hydrocarbon group (alkyl group).

The aromatic hydrocarbon group may, for example, be a phenyl group, an alkylphenyl group or a naphthyl group.

Among the above-described ones, the hydrocarbon group is preferably a monovalent linear, branched or alicyclic saturated hydrocarbon group, more preferably a monovalent linear saturated hydrocarbon group (alkyl group).

The structure of the repeating units (b) is not particularly limited so long as they are ones having the above hydrocarbon group in the side chain.

Preferred repeating units (b) may be polymerized units based on a polymerizable monomer having one monovalent hydrocarbon group and one polymerizable unsaturated group.

The polymerizable unsaturated group may be the same one as mentioned for the above repeating units (a).

From the viewpoint of the pigment affinity, the repeating units (b) are preferably polymerized units based on $CH_2=C(X)-Q^2-R^2$ [wherein $R^2$ is a $C_{1-20}$ hydrocarbon group, X is a hydrogen atom or a methyl group, and $Q^2$ is —COO— (provided that the carbonyl group in —COO— is bonded to the carbon atom to which X is bonded), a single bond or an oxygen atom].

$R^2$ may be the same one as the monovalent hydrocarbon group mentioned as the hydrocarbon group which the above repeating units (b) have in the side chain.

The repeating units (b) contained in the copolymer (1) may be one type alone, or two or more types.

The repeating units (b) may be present not only in the hydrophobic blocks (B) but also in the hydrophilic blocks (A). However, for the advantageous effects of the present invention, among all repeating units (b) contained in the copolymer (1), from 80 to 100 mol % is preferably present in the hydrophobic blocks (B), from 90 to 100 mol % is more preferably present in the hydrophobic blocks (B), and all repeating units (b) (100 mol %) are most preferably present in the hydrophobic blocks (B).

The copolymer (1) may contain repeating units other than the above repeating units (a) and (b) (hereinafter referred to as repeating units (c)).

The repeating units (c) may, for example, be repeating units having no side chain. Such repeating units having no side chain are not particularly limited so long as they are ones based on a monomer which has no side chain and which is copolymerizable with a monomer leading to the above repeating units (a) or (b). Specifically, polymerized units based on an olefin which may be halogenated, may be mentioned. Such an olefin may, for example, be ethylene; a halogenated ethylene such as monochloroethylene or vinylidene chloride; or a diene such as butadiene.

The repeating units (c) contained in the copolymer (1) may be one type alone, or two or more types.

In the present invention, the copolymer (1) preferably comprises from 20 to 80 mol % of the repeating units (a) and from 80 to 20 mol % of the repeating units (b), based on all repeating units, and from 80 to 100 mol % of the repeating units (a) is preferably present in the hydrophilic blocks (A). When the composition of the copolymer (1) is within such a range, the storage stability of the aqueous coating composition, and the gloss, adhesion and water resistance of a coating film obtainable by forming such an aqueous coating composition into a coating material, will be excellent.

In the copolymer (1), the proportion of the repeating units (a) is more preferably from 20 to 60 mol %, further preferably from 20 to 50 mol %, based on all repeating units. When the proportion is at least the lower limit value of the above range, the stability of pigment particles in water will be improved, and when it is at most the upper limit value, the pigment affinity will be improved. In the copolymer (1), the proportion of the repeating units (b) is more preferably from 40 to 80 mol %, further preferably from 50 to 80 mol %, based on all repeating units. When the proportion is at least the lower limit value within the above range, the pigment affinity will be improved, and when it is at most the upper limit value, the stability of pigment particles in water or in an aqueous medium will be improved.

The proportion of the repeating units (a) present in the hydrophilic blocks (A) is as described above.

In the copolymer (1), the proportion of the total of the repeating units (a) and the repeating units (b) is more preferably from 50 to 100 mol %, more preferably from 70 to 100 mol %. As such a proportion is large, the pigment dispersion stability will be improved.

Such a proportion is particularly preferably 100 mol %. That is, the copolymer (1) is particularly preferably composed of the repeating units (a) and the repeating units (b).

In the copolymer (1), the proportion of the repeating units (a) based on the total of repeating units constituting the hydrophilic blocks (A) is preferably from 50 to 100 mol %, more preferably from 70 to 100 mol %. As such a proportion is large, the stability of pigment particles in water will be improved.

The hydrophilic blocks (A) may have the repeating units (b) and/or the repeating units (c) in addition to the repeating units (a).

The proportion of the repeating units (b) present in the hydrophilic blocks (A) is preferably from 0 to 50 mol %, more preferably from 0 to 30 mol %, most preferably 0 mol %, based on the total of repeating units constituting the hydrophilic blocks (A).

The proportion of the repeating units (c) present in the hydrophilic blocks (A) is preferably from 0 to 50 mol %, more preferably from 0 to 30 mol %, most preferably 0 mol %, based on the total of repeating units constituting the hydrophilic blocks (A).

In the copolymer (1), the proportion of the repeating units (b) based on the total of repeating units constituting the hydrophobic blocks (B) is preferably from 50 to 100 mol %, more preferably from 70 to 100 mol %. As such a proportion is large, the pigment affinity will be improved.

The hydrophobic blocks (B) may contain the repeating units (a) and/or the repeating units (c) in addition to the repeating units (b).

The proportion of the repeating units (a) present in the hydrophobic blocks (B) is preferably from 0 to 50 mol %, more preferably from 0 to 30 mol %, most preferably 0 mol %, based on the total of repeating units constituting the hydrophobic blocks (B).

The proportion of the repeating units (c) present in the hydrophobic blocks (B) is preferably from 0 to 50 mol %, more preferably from 0 to 30 mol %, most preferably 0 mol %, based on the total of repeating units constituting the hydrophobic blocks (B).

In the copolymer (1), the ratio (molar ratio) of the total of repeating units constituting the hydrophilic blocks (A) to the total of repeating units constituting the hydrophobic blocks (B) is preferably 20-80:80-20, more preferably 20-60:80-40, further preferably 20-50:80-50. As the proportion of the hydrophobic blocks (B) is large, the pigment affinity will be improved, and as the proportion of the hydrophilic blocks (A) is large, the stability in water of the pigment particles will be improved.

The content of the copolymer (1) in the aqueous coating composition is preferably from 2 to 20 parts by mass, more preferably from 5 to 15 parts by mass, per 100 parts by mass of the pigment contained in the aqueous coating composition. Within such a range, the stability of the aqueous coating composition will be improved, and when formed into a film, the water resistance will be good.

The copolymer (1) may be produced by using a known method for producing a block copolymer, or among commercially available block copolymers, one corresponding to the copolymer (1) may be utilized. Such a block copolymer is available, for example, as an acrylic polymer dispersing agent for an aqueous coating material EFKA4585 (manufactured by Ciba Japan K.K.).

The structure of the block copolymer can be ascertained by a known analytical method such as a nuclear magnetic resonance spectrum method (such as $^{13}$C-NMR or $^{1}$H-NMR).

The aqueous coating composition of the present invention is excellent in the storage stability, since it contains the above copolymer (1). Further, the coating film obtained by using such an aqueous coating composition becomes one excellent in coating-film properties such as gloss, durability, adhesion, appearance, etc.

Heretofore, as a pigment-dispersing agent to be used for an aqueous coating composition, an anionic pigment-dispersing agent is commonly used as it is excellent in the pigment-dispersing performance as compared with a nonionic pigment-dispersing agent. However, the copolymer (1) to be used as a pigment-dispersing agent in the present invention is nonionic.

A reason for adopting a nonionic one is such that the present inventors have found that in an aqueous coating composition comprising a fluoro-olefin copolymer, a pigment, an anionic pigment-dispersing agent and an aqueous medium, the anionic pigment-dispersing agent is one factor to deteriorate the storage stability. The reason for deterioration of the storage stability is considered to be as follows. Firstly, the fluoro-olefin copolymer to be used for the aqueous coating composition usually has acid groups which may form salts (such as amine-neutralized carboxy groups), and a part or whole is self-emulsified to maintain a dispersed state in the aqueous medium. However, if an anionic pigment-dispersing agent is used, the electrical equilibrium in the composition (particularly the electrical equilibrium of the acid groups in the fluoro-olefin copolymer) is disturbed, whereby the dispersion stability of the fluoro-olefin copolymer is considered to be deteriorated. Here, it is considered that in a case where a fluoro-olefin copolymer obtainable by emulsion polymerization by means of an emulsifier (a surfactant) is used, such an aqueous coating composition contains emulsion particles emulsified by the surfactant, whereby the dispersion stability is maintained.

Whereas, in the present invention, by using a nonionic copolymer (1), the electrical equilibrium in the composition is maintained, whereby the stability of the aqueous coating composition comprising a fluoro-olefin copolymer, a pigment, the copolymer (1) and an aqueous medium is considered to be maintained over a long period of time.

Further, the copolymer (1) has the above-described specific structure, whereby it has a high pigment-dispersing performance and is excellent in the dispersion stability of the pigment in an aqueous medium, despite it is nonionic which has been considered to be poor in the pigment-dispersing performance.

Thus, it is considered that by the copolymer (1), the dispersion stability of the fluoro-olefin copolymer and the pigment in the aqueous medium is improved, whereby the storage stability of the entire aqueous coating composition of the present invention is also improved.

[Aqueous Medium]

The aqueous medium is preferably water only or a mixed medium of water with a water-soluble organic solvent, particularly preferably water only. Here, the water-soluble is a nature to be partially or entirely soluble in water, and the water-soluble organic solvent is an organic solvent, whereby said mixed medium becomes a uniform solution.

The water-soluble organic solvent may, for example, be an alcohol such as methanol, ethanol, n-propanol, isopropanol, n-butanol, isobutanol, secondary butanol, tertiary butanol or pentanol; a cellosolve such as methyl cellosolve, ethyl cellosolve, isopropyl cellosolve, butyl cellosolve or secondary butyl cellosolve; a propylene glycol derivative such as propylene glycol methyl ether, dipropylene glycol methyl ether, propylene glycol methyl ether acetate or ethylene glycol ethyl ether acetate; or a ketone such as acetone, methyl ethyl ketone or methyl isobutyl ketone.

In a case where the aqueous medium contains a water-soluble organic solvent, the content of the organic solvent in the aqueous medium is preferably from 0 to 5 mass %, more preferably from 0 to 1 mass %.

The amount of the aqueous medium in the aqueous coating composition is such an amount that the concentration of the fluoro-olefin copolymer will be from 3 to 50 mass %, particularly preferably from 20 to 50 mass %.

The aqueous coating composition of the present invention may further contain a synthetic resin (hereinafter referred to as another synthetic resin) other than the above fluoro-olefin copolymer and the above copolymer (1).

Another synthetic resin may be a synthetic resin of e.g. phenol type, alkyd type, melamine type, urea type, vinyl type, epoxy type, polyester type, polyurethane type or acrylic type. Otherwise, a fluororesin other than the above fluoro-olefin copolymer may be used.

Another synthetic resin is also preferably dissolved and/or dispersed in the aqueous medium, like the above fluoro-olefin copolymer. A known method may be employed as the method for dissolving and/or dispersing another synthetic resin in the aqueous medium.

As another synthetic resin, a commercially available emulsion may be utilized. Specifically, fluororesin LUMIFLON FE4400 for coating material, manufactured by Asahi Glass Company, Limited, or acrylic resin LX1030, manufactured by Mitsubishi Rayon Co., Ltd. may be mentioned.

The blend amount of another synthetic resin in the aqueous coating composition is preferably from 0 to 90 mass %, more preferably from 0 to 70 mass %, based on the total mass of the fluoro-olefin copolymer.

In a case where another synthetic resin is contained, the total amount of the fluoro-olefin copolymer and another synthetic resin in the aqueous coating composition is preferably from 3 to 50 mass %, more preferably from 20 to 50 mass %, based on the total mass of the aqueous medium.

The aqueous coating composition may further suitably contain additives such as a film-forming assistant, a surface-adjusting agent, a thickener, an ultraviolet absorber, a photostabilizer, a defoaming agent and a pH-adjusting agent.

The film-forming assistant may, for example, be diethylene glycol monoethyl ether acetate, 2,2,4-trimethyl-1,3-pentadiol mono(2-methylpropanate) or diethylene glycol diethyl ether.

The surface-adjusting agent may, for example, be preferably a polyether-modified polydimethylsiloxane or a polyether-modified siloxane.

The thickener may, for example, be preferably a polyurethane type associative thickener.

As the ultraviolet absorber, known various types may be used. For example, an ultraviolet absorber such as a salicylic acid ester, a benzophenone, a benzotriazole or a nickel complex salt; bis(2,2,6,6-tetramethyl-4-piperidine)sebacate, a succinic acid/dimethyl-1-(2-hydroxyethyl)-4-hydroxy-2,2,6, 6-tetramethylpiperidine polycondensate, 2-(3,5-di-t-butyl-4-hydroxybenzyl)-2-n-butyl malonic acid bis(1,2,2,6,6-pentamethyl-4-piperidyl); and ultraviolet absorbers having other ultraviolet-absorbing groups may be mentioned. In a case where an ultraviolet absorber is incorporated, it is preferably from 0.1 to 15 mass %, based on the total mass of the fluoroolefin-type copolymer and, when another synthetic resin is contained, such another synthetic resin, in the aqueous coating composition.

The photostabilizer may, for example, be a photostabilizer of hindered amine type such as SANOR LS765 manufactured by Sankyo Co., Ltd., Mark LA 57, 62, 63, 67 or 68 manufactured by Adeka Argus Chemical Co., Ltd., or TINUVIN 622LD manufactured by Ciba Geigy Company.

The defoaming agent may, for example, be a fatty acid salt, a higher alcohol sulfate, a liquid fatty oil sulfuric acid ester, an aliphatic amine or aliphatic amide sulfate, an aliphatic alcohol phosphoric acid ester, a sulfonic acid salt of a dibasic fatty acid ester, a fatty acid amide sulfonic acid salt, an alkyl allyl sulfonic acid salt, a formalin-condensed naphthalene sulfonic acid salt, a polyoxyethylene alkyl ether, a polyoxyethylene alkyl phenol ether, a polyoxyethylene alkyl ester, a sorbitan alkyl ester, a polyoxyethylene sorbitan alkyl ester, an acrylic polymer, a silicone-mixed acrylic polymer, a vinyl polymer or a polysiloxane compound.

The aqueous coating composition is good in stability even without containing an emulsifier, but in order to improve the stability, a small amount of an emulsifier may be incorporated.

The emulsifier may, for example, be an anionic emulsifier, a low molecular weight nonionic emulsifier, or a combination thereof. Here, the "low molecular weight nonionic emulsifier" represents a nonionic emulsifier having a molecular weight of at most 3,000.

Such a low molecular weight nonionic emulsifier may, for example, be preferably an alkylphenol ethylene oxide adduct, a higher alcohol ethylene oxide adduct or a block copolymer of ethylene oxide with propylene oxide.

In a case where a low molecular weight nonionic emulsifier is incorporated, its blend amount is preferably more than 0 to 5 mass %, based on the total mass of the fluoro-olefin copolymer and when another synthetic resin is contained, such another synthetic resin in the aqueous coating composition.

The anionic emulsifier may, for example, be preferably an alkylbenzene sulfonate, an alkylnaphthalene sulfonate, a higher fatty acid salt, an alkylsulfuric acid ester, an alkyl ether sulfuric acid ester or a phosphoric acid ester.

In a case where an anionic emulsifier is incorporated, its amount is preferably more than 0 to 2 mass %, based on the total mass of the fluoro-olefin copolymer and, when another synthetic resin is contained, such another synthetic resin in the aqueous coating composition.

However, in the present invention, the aqueous coating composition preferably contains no emulsifier from the viewpoint of the water resistance, weather resistance, adhesion, etc. of the obtainable coating film. To the aqueous coating composition, an inorganic or organic deluster agent may be incorporated in order to adjust the gloss of the coating film.

The aqueous coating composition of the present invention can be produced by dissolving and/or dispersing the fluoroolefin copolymer, the pigment, the copolymer (1) and optional various components in an aqueous medium.

In the present invention, it is particularly preferred to produce the aqueous coating composition of the present invention by <<PROCESS FOR PRODUCING AQUEOUS COATING COMPOSITION>> given hereinafter, since the performance, etc. of the obtainable coating film will thereby be excellent.

The aqueous coating composition of the present invention may be used as one pack type aqueous coating material by blending it into various emulsion coating materials, or may be used as a two pack type aqueous coating material, which is to be used as mixed with a curing agent at the time of practical use. Preferably, it is used as a two pack type aqueous coating material. In a case where it is used as a two pack type aqueous coating material, as the fluoro-olefin copolymer, one having acid groups which may form salts is used, and as the curing agent, a water-soluble or water-dispersible curing agent which is cross-linkable with a hydroxy group is used. Such a curing agent will be described in <<PROCESS FOR FORMING COATING FILM>> given hereinafter.

The aqueous coating composition of the present invention contains a fluoro-olefin copolymer and is capable of forming a coating film excellent in various properties such as the weather resistance, and thus, it is useful for a top coating to be applied to the topmost surface of a coating for building, corrosion prevention, etc. Further, it is useful also for coating of the surface of the front sheet or back sheet of a solar cell.

<<Process for Producing Aqueous Coating Composition>>

The process for producing an aqueous coating composition of the present invention, to produce the above-mentioned aqueous coating composition of the present invention, comprises a step of producing a fluoro-olefin copolymer aqueous dispersion by obtaining the fluoro-olefin copolymer by a solution polymerization using an organic solvent, and dissolving and/or dispersing the fluoro-olefin copolymer in an aqueous medium (hereinafter referred to as step (I)); a step of producing a pigment aqueous dispersion by dissolving and/or dispersing a pigment and the copolymer (1) in an aqueous medium (hereinafter referred to as step (II)); and a step of mixing the fluoro-olefin copolymer aqueous dispersion and the pigment aqueous dispersion (hereinafter referred to as step (III)).

In the present invention, steps (I) and (II) may be carried out in this order, or may be carried out in a reverse order, or steps (I) and (II) may simultaneously be carried out in parallel. Further, between steps (I) to (III), e.g. between steps (II) and (III), another step may be inserted, as the case requires.

By preliminarily producing the fluoro-olefin copolymer aqueous dispersion and the pigment aqueous dispersion, respectively, and mixing them in step (III), as described above, it is possible to produce a uniform and highly stable aqueous coating composition without impairing the dispersion stability of the fluoro-olefin copolymer and the pigment.

Now, the respective steps will be described in further detail.

[Step (I)]

In step (I), the above-mentioned fluoro-olefin copolymer is produced by means of a solution polymerization method using an organic solvent. The fluoro-olefin copolymer obtained by means of the solution polymerization method has a merit in that as compared with a copolymer obtained by an emulsion polymerization method, when it is formed into a coating film as an aqueous coating material, particles of the copolymer are likely to be fused to one another to form a uniform coating film.

As the solution polymerization method, a known solution polymerization technique may be used.

In step (I), "the fluoro-olefin copolymer is obtained by means of a solution polymerization method" means that the fluoro-olefin copolymer is obtained by a production process wherein at least one step among the production steps includes a polymerization step by means of a solution polymerization method. The production process for the fluoro-olefin copolymer may have other steps in addition to the polymerization step by means of a solution polymerization method.

For the production of the fluoro-olefin copolymer in step (I), a known method may suitably be used depending upon the structure of the fluoro-olefin copolymer to be produced.

For example, in a case where the above-mentioned "fluoroolefin copolymer having acid groups which may form salts" (hereinafter referred to as the acid group-containing fluoroolefin copolymer) is used as the fluoro-olefin copolymer, its production method is preferably the following method (I-1) or (I-2).

Method (I-1): A method of obtaining the acid group-containing fluoroolefin copolymer as the polymerization product by means of a solution polymerization method using an organic solvent.

Method (I-2): A method of obtaining a polymerization product by means of a solution polymerization method using an organic solvent and introducing acid groups to the polymerization product to obtain the acid group-containing fluoroolefin copolymer.

Method (I-1) can be carried out by the same method as disclosed in WO2007/125970 by the present applicant.

For example, in the case of a fluorinated copolymer (F) comprising the above units (f) to (i) as essential components, it is preferred to subject at least monomers which respectively correspond to the units (f) to (i) to radical polymerization by means of a solution polymerization method using an organic solvent.

The organic solvent to be used for the solution polymerization method may be the after-mentioned water-soluble organic solvent or non-water-soluble organic solvent, or may be their mixture.

Examples of the organic solvent include an alcohol such as methanol, ethanol, n-propanol, isopropanol, n-butanol, isobutanol, secondary butanol, tertiary butanol or pentanol, a cellosolve such as methyl cellosolve, ethyl cellosolve, isopropyl cellosolve, butyl cellosolve or secondary butyl cellosolve, a propylene glycol derivative such as propylene glycol methyl ether, dipropylene glycol methyl ether, propylene glycol methyl ether acetate or ethylene glycol ethyl ether acetate, a ketone such as acetone, methyl ethyl ketone or methyl isobutyl ketone, and an aromatic compound such as toluene or xylene.

As the organic solvent, it is preferred to use an alcohol, an ester, a ketone, a saturated halogenated hydrocarbon containing at least one fluorine atom, or an aromatic hydrocarbon such as xylene. Particularly preferred is acetone, methyl ethyl ketone, ethanol, methanol, xylene or a mixed solvent thereof.

The polymerization by means of a solution polymerization method may be carried out in the presence of a polymerization initiator.

As the polymerization initiator, a peroxyester type peroxide such as t-butylperoxy pivalate or t-butylperoxy acetate, a dialkyl peroxy dicarbonate such as diisopropyl peroxy dicarbonate, benzoyl peroxide or azobisisobutylonitrile may, for example, be used.

The amount of the polymerization initiator to be used may be suitably changed depending upon the type of the polymerization initiator to be used, the polymerization reaction conditions (such as the reaction temperature and the reaction pressure), etc., but it is usually at a level of from 0.05 to 0.5 mass % based on the total amount of monomers to be copolymerized.

In method (I-2), the above-mentioned acid groups are introduced to the polymerization product obtained by means of a solution polymerization method using an organic solvent to obtain the acid group-containing fluoro-olefin copolymer.

The solution polymerization method in method (I-2) can be carried out in the same manner as the solution polymerization method in method (I-1). However, in method (I-2), after the polymerization by means of a solution polymerization method, acid groups are introduced into the obtained polymerization product, and therefore, a monomer which directly forms units having acid groups such as the above-mentioned units (g), may not necessarily be polymerized.

That is, acid groups may or may not be contained in the fluoro-olefin copolymer (hereinafter referred to as a precursor copolymer) as a polymerization product by means of a solution polymerization method in method (I-2).

In a case where the precursor copolymer contains acid groups, such acid groups contained in the precursor copolymer may be the same or different from the acid groups of the desired acid group-containing fluoroolefin copolymer.

The amount of acid groups contained in the precursor copolymer is preferably smaller than the amount of acid groups contained in the acid group-containing fluoro-olefin copolymer to be produced. Particularly, from the viewpoint of the polymerization stability, it is preferred that no acid groups are contained in the precursor copolymer.

For example, in a case where as the acid-group-containing fluoro-olefin copolymer, the above-mentioned fluorinated copolymer (F) is to be produced by method (I-2), the proportion of units (g) in the precursor copolymer is preferably less than 5 mol %, particularly preferably 0 mol %.

The precursor copolymer may preferably has groups convertible to acid groups of the desired acid group-containing fluoro-olefin copolymer, or groups capable of being reacted with another compound having such acid groups.

For example, in a case where the precursor copolymer is one having hydroxy groups, by utilizing the reactivity of such hydroxy groups, acid groups can be introduced by a method of converting such hydroxy group to acid groups.

The method for introducing acid groups to the precursor copolymer may be a method of introducing acid groups by utilizing the reactivity of hydroxy groups derived from e.g. the above units (i) to convert the hydroxy groups to acid groups.

The method of converting hydroxy groups to acid groups may be carried out, for example, in such a manner that a fluoro-olefin copolymer having hydroxyl groups bonded thereto, is reacted with a dibasic acid anhydride in an organic solvent to partially esterify hydroxy groups to introduce carboxy groups.

The dibasic acid anhydride may, for example, be preferably succinic anhydride, glutaric anhydride, itaconic anhydride, adipic anhydride, 1,2-cyclohexane dicarboxylic acid anhydride, cis-4-cyclohexene-1,2-dicarboxylic acid anhydride, phthalic anhydride, 1,8-naphthalic anhydride or maleic anhydride.

The amount of the dibasic acid anhydride is preferably such an amount that the proportion of the total amount of units to which carboxy groups are bonded would be at least 0.4 mol % and less than 5 mol % based on all units in the polymer, more preferably such an amount that such a proportion will be at least 2 mol % and less than 4 mol %. When it is at least 0.4 mol % and less than 5 mol %, the dissolution and/or dispersion in water becomes easy, and the stability of such an aqueous solution will be good.

For the esterification reaction, a catalyst may be used in combination. The catalyst is preferably a metal salt of a carboxylic acid, an alkali metal hydroxide, an alkali metal carbonate, a quaternary ammonium salt or a tertiary amine, particularly preferably a tertiary amine such as triethylamine.

The reaction temperature for the esterification step is preferably from 20 to 150° C., more preferably from 50 to 100° C. The reaction time is at a level of a few tens minutes to a few hours. The esterification reaction is preferably carried out in an organic solvent. As the organic solvent, it is preferred to use the above-mentioned water-soluble organic solvent.

In a case where a fluorinated copolymer (F) comprising the above units (f) to (i) as essential units is to be produced by utilizing the method for converting hydroxy groups to acid groups, it is preferred to produce a copolymer comprising units (f), (h) and (i) as essential units, as the precursor copolymer. Such a copolymer may or may not contain units (g). The proportion of units (g) in such a copolymer is preferably less than 5 mol %, particularly preferably 0 mol %. That is, such a copolymer particularly preferably contains no units (g). Further, such a copolymer may contain units (j). The proportions of units (f), (h) and (j) in the copolymer are preferably the same as the preferred proportions of the respective units in the above-described fluorinated copolymer (F). Further, the proportion of units (i) in the copolymer is preferably the same amount as the total amount of units (g) and (i) in the desired fluorinated copolymer (F).

Further, in a case where one having a salt group (an acid group forming a salt) such as a carboxylate group is to be produced as the acid group-containing fluoro-olefin copolymer, it is preferred to obtain it by a method wherein a fluoro-olefin copolymer having an acid group which is not forming a salt, is obtained by e.g. the above-mentioned method (I-1) or (I-2), and further, such a fluoro-olefin copolymer is reacted with a basic compound to convert the acid group to a salt group.

Such a reaction can be carried out by adding a basic compound or an aqueous solution of a basic compound to an organic solvent having a fluoro-olefin copolymer dissolved, at a temperature in the vicinity of room temperature.

The basic compound is preferably a compound having a boiling point of at most 200° C., which tends to hardly remain in the coating film, and it may, for example, be ammonia; a primary, secondary or tertiary alkylamine such as monomethylamine, dimethylamine, trimethylamine, monoethylamine, diethylamine, triethylamine, monoisopropylamine, diisopropylamine, triisopropylamine, monobutylamine or dibutylamine; an alkanolamine such as monoisopropanolamine, dimethylaminoethanol or diethylaminoethanol, or methyldiethanolamine; a diamine such as ethylene diamine, propylene diamine, tetramethylene diamine or hexamethylene diamine; an alkylene imine such as ethylene imine or propylene imine; or piperazine, morpholine, pyrazine or pyridine.

Among acid groups in the fluoro-olefin copolymer having acid groups, the proportion of the acid groups to be neutralized by the basic compound i.e. the proportion of the acid groups forming salts, is not particularly limited, but is preferably from 30 to 100%, more preferably from 50 to 100%. The proportion of the acid groups forming salts may suitably be changed by the amount of the basic compound to be used for the neutralization.

Then, the fluoro-olefin copolymer obtained by the solution polymerization is dissolved and/or dispersed in an aqueous medium to obtain a fluoro-olefin copolymer aqueous dispersion. After forming the fluoro-olefin copolymer into an aqueous dispersion, it is mixed with a pigment aqueous dispersion produced in step (II) in the after-mentioned step (III), whereby it is possible to produce a more uniform, highly stable aqueous coating composition without impairing the dispersion stability of the fluoro-olefin copolymer and the pigment.

As the aqueous medium to be used in step (I), it is possible to employ the same one as mentioned as an aqueous medium which the aqueous coating composition of the present invention contains.

The method for producing the fluoro-olefin copolymer aqueous dispersion is preferably a method of dispersing the fluoro-olefin copolymer dissolved in a water-soluble organic solvent, in an aqueous medium, by means of an emulsifier, or a method of adding the fluoro-olefin copolymer to an aqueous medium and dispersing it mechanically by e.g. stirring.

In a case where the organic solvent to be used for the solution polymerization method is a water-soluble organic solvent such as methanol, ethanol, acetone, methyl ethyl ketone or butyl acetate, the organic solvent solution of the fluoro-olefin copolymer may be used as it is.

In a case where the organic solvent used in the solution polymerization method is to be changed to another water-soluble organic solvent, it is preferred to employ a method wherein the organic solvent used for the solution polymerization method is distilled off, and the solidified fluoro-olefin copolymer thereby obtained is dissolved in a water-soluble organic solvent for use.

The change to another water-soluble organic solvent is preferably carried out before the neutralization reaction in a case where the fluoro-olefin copolymer is to be produced by the neutralization reaction of carboxy groups, or before the esterification reaction in a case where the fluoro-olefin copolymer is to be produced by carrying out the esterification reaction of hydroxy groups. It is thereby possible to prevent gelation of the fluoro-olefin copolymer.

In a case where the organic solvent is contained in a large amount in the fluoro-olefin copolymer aqueous dispersion, it is preferred to distill off the organic solvent. Such distilling off of the organic solvent is preferably carried out so that the amount of the organic solvent in the aqueous dispersion after distilling off will be at most 1 mass % based on the total mass of the aqueous dispersion. The amount of the organic solvent is more preferably at most 0.3 mass %, and may be 0 mass %.

The fluoro-olefin copolymer aqueous dispersion obtained by the above-described method is preferably employed as it is for the preparation of the aqueous coating composition in step (III).

[Step (II)]

In step (II), a pigment aqueous dispersion is produced by dissolving and/or dispersing a pigment and the copolymer (1) in an aqueous medium.

The pigment aqueous dispersion is preferably produced by mixing the pigment and a pigment-dispersing agent together with the aqueous medium. Such mixing is preferably carried out by means of a mixer or the like in order to obtain a uniform pigment aqueous dispersion. Further, various additives as described hereinafter may be added at the time of the mixing.

The amount of the pigment to be used for the production of the pigment aqueous dispersion is suitably adjusted so that the amount of the pigment in the aqueous coating composition finally obtainable will be the desired value.

Further, the amount of the pigment in the pigment aqueous dispersion is preferably from 50 to 80 parts by mass, particularly preferably from 65 to 75 parts by mass, per 100 parts by mass of the pigment aqueous dispersion. By adjusting the amount within such a range, the obtainable coating material will have a high opacifying effect and low viscosity, and it is possible to obtain a pigment aqueous dispersion whereby the mixing in step (III) will be facilitated.

The amount of the pigment dispersing agent in the pigment aqueous dispersion is preferably from 2 to 20 parts by mass, particularly preferably from 5 to 15 parts by mass, per 100 parts by mass of the pigment. By adjusting the amount within such a range, the stability of the pigment aqueous dispersion will be improved, and when formed into a coating film, the water resistance will be good.

To the pigment aqueous dispersion, additives such as a defoaming agent, a surface-adjusting agent, an emulsifier and a pH-adjusting agent may further be incorporated.

The pigment aqueous dispersion obtained in step (II) is preferably employed as it is for the preparation of the aqueous coating composition in step (III).

[Step (III)]

Step (III) is a step of mixing the fluoro-olefin copolymer aqueous dispersion obtained in step (I) and the pigment aqueous dispersion obtained in step (II). It is thereby possible to obtain an aqueous coating composition of the present invention comprising the fluoro-olefin copolymer, the pigment, the following copolymer (1) and the aqueous medium.

The aqueous coating composition of the present invention can be made to be an aqueous coating composition wherein no organic solvent is contained or the content of an organic solvent is little, by a method of using an aqueous medium containing no or little organic solvent in each step of the above-described production process, or a method of removing an organic solvent by a known technique such as distillation under reduced pressure from at least one of the fluoro-olefin copolymer aqueous dispersion obtained in step (I), the pigment aqueous dispersion obtained in step (II) and the aqueous coating composition obtained in step (III). By containing no or little organic solvent, the coating composition will be one presenting little impact on the environment, such being desirable.

The amount of the organic solvent in the aqueous coating composition can be adjusted by adjusting the content of the organic solvent in the aqueous medium to be used in the production process or by adjusting the amount of the organic solvent to be removed from the aqueous dispersion or the aqueous coating composition.

From the viewpoint of the environment load and flammability, the amount of the organic solvent in the aqueous coating composition is preferably at most 1 mass %, more preferably at most 0.3 mass % and may be 0 mass %, based on the total mass of the aqueous coating composition.

The aqueous coating composition of the present invention has high dispersion stability of the fluoro-olefin copolymer and the pigment, even when the content of the organic solvent is little.

<<Process for Forming Coating Film>>

The process for forming a coating film of the present invention comprises a step of blending the aqueous coating composition of the present invention with a water-soluble or water-dispersible curing agent to obtain an aqueous coating material, and a step of applying the aqueous coating material to a surface of a substrate.

In a case where a coating film is formed by such a process, it is preferred to employ as the aqueous coating composition one containing a fluoro-olefin copolymer having acid groups which may form salts and hydroxy groups (such as the above fluorinated copolymer (F)) as the above fluoro-olefin copolymer. Such hydroxy groups usually function as cross-linking reactive groups to react with a curing agent to form cross-links, whereby it is possible to form a coating film (a cured film) excellent in the gloss, hardness, adhesion, water resistance and weather resistance, by blending the aqueous coating composition with a curing agent cross-linkable with hydroxy groups to form an aqueous coating material and applying such a coating material on a surface of a substrate, followed by cross-linking.

As the curing agent, a water-soluble or water-dispersible curing agent is used.

As the curing agent, a normal temperature-curable or heat-curable curing agent may be used, but in the present invention, it is preferred to employ a normal temperature-curable curing agent.

When a normal temperature-curable one is selected as the curing agent, cross-linking will proceed by drying at a normal temperature at a level of from 20 to 25° C. after the application, whereby it is possible to form a coating film without carrying out a special treatment such as heating.

In a case where a heat-curable one is used, a coating film can be formed by heating such as heat-baking after the application. The heating conditions such as the heating temperature, heating time, etc. may suitably be determined depending upon the type, etc. of the curing agent to be used.

The curing agent is preferably a curing agent having a functional group which is reactive with a hydroxy group and/or a carboxy group. Such a curing agent may, for example, be an isocyanate compound, a melamine resin, a phenol resin, a xylene resin or a toluene resin. Among them, an isocyanate compound is preferred, since a coating film excellent in the weather resistance and the mechanical property is thereby readily obtainable. As such a curing agent, one type may be used alone, or two or more types may be used in combination.

The isocyanate compound is preferably a water-dispersible isocyanate compound.

The water-dispersible isocyanate compound may, for example, be a mechanically water-dispersible polyisocyanate compound or a self-emulsifiable polyisocyanate compound. Among them, a self-emulsifiable polyisocyanate compound is preferred.

Here, the "polyisocyanate compound" is a compound having at least two isocyanate groups in its molecule. The "mechanically water-dispersible polyisocyanate compound"

is a polyisocyanate compound which requires mechanical dispersing treatment for dispersion in water.

The "self-emulsifiable polyisocyanate compound" is a polyisocyanate compound which can be emulsified and dispersed in water even without an emulsifier or mechanical dispersing treatment.

The mechanically water-dispersible polyisocyanate compound may, for example, be an aliphatic polyisocyanate such as hexamethylene diisocyanate, an aromatic polyisocyanate such as m- or p-phenylene diisocyanate, 2,4- or 2,6-tolylene diisocyanate, diphenylmethane-4,4'-diisocyanate, naphthalene-1,5-diisocyanate or 4,4'-diisocyanate-3,3'-dimethyldiphenyl, an alicyclic polyisocyanate such as bis-(isocyanate cyclohexyl)methane or isophorone diisocyanate, a crude polyisocyanate such as crude tolylene diisocyanate or crude diphenylmethane diisocyanate, or a modified polyisocyanate such as a carbodiimide-modified diphenylmethane diisocyanate, a polyol-modified diphenylmethane diisocyanate or a polyol-modified hexamethylene diisocyanate.

Such polyisocyanates may be ones in the form of dimmers or trimmers of a Burette type, isocyanurate type or uretdione type, or they may be blocked polyisocyanates having isocyanate groups reacted with a blocking agent.

The blocking agent may, for example, be an alcohol, a phenol, a caprolactam, an oxime or an active methylene compound.

A blocked polyisocyanate will not usually be cured unless the temperature is at least 140° C., and it is preferred to use a polyisocyanate which is not blocked, in a case where the coating film is cured at a lower temperature.

As such a polyisocyanate, one type may be used alone, or two or more types may be used in combination.

The self-emulsifiable polyisocyanate compound may, for example, be a prepolymer obtained by reacting the above polyisocyanate with a hydrophilic polyoxyalkylene, and a compound disclosed in JP-A-4-15270 may be employed. Further, such a reaction can be carried out by a known method. The hydrophilicity with respect to the self-emulsifiable polyisocyanate compound is meant for the presence of a structure having affinity to water in its structure, and the hydrophilic compound is a compound, of which a part or whole can be dissolved, emulsified or dispersed in water.

The hydrophilic polyoxyalkylene is preferably a compound having at least one isocyanate reactive group and having a molecular weight of from 200 to 4,000, particularly preferably a polyoxyalkylene polyol or a polyoxyalkylene monool having a molecular weight of from 300 to 1,500. With one having a low molecular weight, the self-emulsifiability cannot sufficiently be obtainable, and with one having a high molecular weight, the self-emulsifying property is good, but the stability in water tends to deteriorate, or the crystallinity tends to be high, whereby the storage stability at a low temperature tends to be low, and turbidity is likely to occur.

The oxyalkylene chains in the polyoxyalkylene, are preferably all or at least one half thereof oxyethylene groups, from the viewpoint of the hydrophilicity.

For the reaction of the polyisocyanate with the hydrophilic polyoxyalkylene, the amount of the compounds are preferably adjusted so that the amount of remaining isocyanate groups will be from 10 to 24 mass %. If the amount of remaining isocyanate groups is less than 10 mass %, the reactivity with the fluoro-olefin copolymer tends to be low, such being undesirable. Further, a large amount of the isocyanate compound will be required to accomplish a sufficient cross-linking degree, and such may adversely affect the weather resistance of the coating material and thus is undesirable. If the amount of remaining isocyanate groups is too much, a stable emulsion tends to be hardly formed, such being undesirable.

As the self-emulsifiable isocyanate compound, a commercial product such as Bayhydur 3100, manufactured by Sumika Bayer K.K. or BASONAT HW100 manufactured by BASF may also be used.

The melamine resin as the curing agent may be an alkyl-etherified melamine resin such as a methyl-etherified, butyl-etherified or isobutyl-etherified melamine resin may be mentioned, and from the viewpoint of the water-solubility, an at least partially methyl-etherified melamine resin is preferred.

In the present invention, as the curing agent, a normal temperature-curable water-dispersible isocyanate compound is particularly preferred.

Among the above-mentioned water-dispersible isocyanate compounds, a prepolymer obtained by reacting a non-blocked polyisocyanate with a hydrophilic polyoxyalkylene corresponds to the normal temperature-curable water-dispersible isocyanate compound.

The blend amount of the curing agent is preferably from 5 to 50 mass %, more preferably from 10 to 40 mass %, based on the total mass of the fluoro-olefin copolymer and, when another synthetic resin is contained, such another synthetic resin, in the aqueous coating composition.

EXAMPLES

Now, the present invention will be described in detail with reference to Examples, but it should be understood that the present invention is by no means restricted thereto.

In Examples, "parts" means parts by mass, unless otherwise specified.

In the following Examples, the acid value was obtained by dissolving 1 g of a sample in 10 ml of tetrahydrofuran, followed by neutralization titration with a 100 mol/m$^3$ potassium hydroxide solution in ethyl alcohol at 23° C. and by using the following formula. The neutralization point was judged by means of phenolphthalein. In the following formula, "solid content concentration (g/g)" is also referred to as "solid content ratio".

$$\text{Acid value(mgKOH/g sample)} = [\text{titer(ml)}] \times 5.61/[\text{solid content concentration of sample}]$$

Example 1

(i)

Into a stainless steel autoclave having an internal capacity of 250 cc and equipped with a stirrer (pressure resistance: 50 kg/cm$^2$·G), 5.4 parts of ethyl vinyl ether (EVE), 9.4 parts of cyclohexyl vinyl ether (CHVE), 11.6 parts of hydroxybutyl vinyl ether (HBVE), 25 pars of ethanol (EtOH), 102 parts of xylene (Xy), 1.0 part of potassium carbonate and 0.6 part of t-butyl peroxy pivalate were charged, and after removing dissolved air by deaeration under cooling, 30.2 parts of chlorotrifluoroethylene (CTFE) was charged, followed by a reaction at 50° C. for 24 hours. After purging the residual pressure and filtration, 0.005 part of methoxyphenol and 0.03 part of Tinuvin 144 (manufactured by Ciba Specialty Chemicals K.K., ultraviolet ray stabilizer) were added, and the solvent and non-reacted volatile substances were removed by drying to obtain fluorinated copolymer flakes having a solid content of 99.6 mass %.

The molecular weight of the obtained fluorinated copolymer was measured by GPC, whereby the number average molecular weight (Mn) was $7.5 \times 10^3$. Further, the molecular weight distribution (Mw/Mn) was 2.3.

30 Parts of the fluorinated copolymer was dissolved in 20 parts of methyl ethyl ketone (MEK), and 0.8 part of succinic anhydride and 0.01 part of triethylamine as a catalyst, were added, followed by a reaction at 55° C. for 7 hours (esterification).

The infrared absorption spectrum of the reaction solution was measured, whereby the characteristic absorptions by the anhydride ($1,870$ $cm^{-1}$, $1,790$ $cm^{-1}$) observed before the reaction were found disappeared after the reaction, and absorptions by a carboxylic acid ($1,710$ $cm^{-1}$) and an ester ($1,735$ $cm^{-1}$) were observed.

The acid value of the fluorinated copolymer after the esterification was 15.5 mgKOH/g.

Then, to the fluorinated copolymer after the esterification, 0.9 part of triethylamine was added and stirred at room temperature for 20 minutes to neutralize the carboxylic acid, and 56 parts of deionized water was gradually added.

Finally, MEK was distilled off under reduced pressure until the total amount became less than 1 mass % of the fluorinated copolymer solid content to obtain an aqueous dispersion of the fluorinated copolymer being a fluoro-olefin copolymer having a solid content concentration of 40.2 mass %.

The amount of the solvent remaining in the obtained aqueous dispersion was measured and found to be 0.15 mass % based on the total mass of the aqueous dispersion.

(ii)

Separately, an acrylic polymer dispersing agent for aqueous coating material (tradename: EFKA4585, manufactured by Ciba Japan K.K.) was prepared. According to analyses by $^{13}C$-NMR and $^1H$-NMR, this polymer dispersing agent was a block copolymer wherein one end of a hydrophilic block made of the following units (11) was bonded to one end of a hydrophobic block made of the following units (12), the hydrophilic block of units (11):the hydrophobic block made of the following units (12)=35:65 (molar ratio), and the value x in the formula (11) was about 10.

70 Parts of a titanium oxide pigment Tipure R-706 (manufactured by Du Pont Kabushiki Kaisha), 7 parts of the above acrylic polymer dispersing agent, 1.7 parts of a defoaming agent SN1314 (manufactured by San Nopco Limited), 21.3 parts of deionized water and 100 parts of glass beads were mixed and dispersed by means of a dispersing machine, whereupon the glass beads were removed by filtration to obtain a pigment aqueous dispersion.

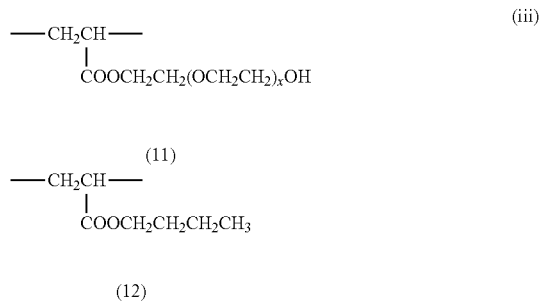

30.1 Parts of the pigment aqueous dispersion obtained in the above (ii), 75 parts of the aqueous dispersion of the fluorinated polymer obtained in the above (i), 0.23 part of a thickener Rheolate 288 (manufactured by Elementis plc) and 0.4 part of a thickener Bermodoll PUR-2150 (manufactured by Akzo Nobel) were mixed to obtain an aqueous coating composition (X).

Comparative Example 1

Pigment dispersion was carried out in the same manner as in Example 1(ii) except that the pigment dispersing agent was changed to 7 parts of EFKA4550 (manufactured by EFKA, acrylic random copolymer), but the titanium oxide pigment Tipure R-706 was not dispersed in water, and no uniform pigment base was obtainable.

Comparative Example 2

A pigment aqueous dispersion was prepared in the same manner as in Example 1(ii) except that the pigment dispersing agent was changed to 7 parts of EFKA5071 (manufactured by EFKA, alkylol ammonium salt of polymer unsaturated carboxylic acid).

30.1 parts of this pigment aqueous dispersion, 75 parts of the aqueous dispersion of the fluorinated polymer obtained in Example 1(i), 0.23 part of the thickener Rheolate 288 (manufactured by Elementis plc) and 0.4 part of the thickener Bermodoll 2150 (manufactured by Akzo Nobel) were mixed to obtain an aqueous coating composition (Y).

Test Example 1

Storage Stability Test

The aqueous coating compositions (X) and (Y) obtained in Example 1 and Comparative Example 2 were, respectively, held at 50° C. for 4 weeks, whereupon their appearances were observed.

As a result, no change was observed on the appearance of the aqueous coating composition (X) obtained in Example 1.

On the other hand, in the aqueous coating composition (Y) obtained in Comparative Example 2, hard coagulated precipitates were formed, and the composition did not return to a uniform coating material.

Test Example 2

Coating Test

To 40 parts of each of the aqueous coating compositions (X) and (Y) immediately after the production, 4.3 parts of a water-dispersed isocyanate curing agent Bayhydur 3100 (manufactured by Sumika Bayer K.K.) was added and mixed with stirring.

The obtained mixture was applied to the surface of a chromate-treated aluminum plate and dried at room temperature for two weeks.

As a result, the coating film obtained by using the aqueous coating composition (X) had a 60° gloss of 84 and had a good appearance. Whereas, the coating film obtained by using the aqueous coating composition (Y) had a 60° gloss of 83 and had a good appearance.

Test Example 3

Water Resistance Test

The coating films obtained in Test Example 2 were, respectively, dipped in warm water of 40° C. for 24 hours, whereupon their appearances were observed.

As a result, with respect to each of the coating films obtained by using the aqueous coating compositions (X) and (Y), no bubble, swelling or deterioration of the gloss was observed.

Test Example 4

Adhesion Test

With respect to the coating films obtained in Test Example 2, an adhesion test was carried out in accordance with ASTM D3359, respectively.

As a result, each of the coating films obtained by using the aqueous coating compositions (X) and (Y) was found to have good adhesion to a substrate without peeling from the substrate.

As is evident from the above results, the aqueous coating composition in Example 1 was excellent in the storage stability even without containing an emulsifier. Further, the coating film formed by using such an aqueous coating composition was one excellent in the coating film properties such as the gloss, appearance, water resistance and adhesion. On the other hand, with the aqueous coating composition in Comparative Example 2 wherein the pigment dispersing agent was changed, the storage stability was inadequate, although the coating film properties were good.

INDUSTRIAL APPLICABILITY

The aqueous coating composition of the present invention has a high storage stability and thus is useful as a top coating to cover the topmost surface of coating for buildings, corrosion prevention, etc. Further, it is useful also for coating the surface of the front sheet or back sheet of a solar cell.

The entire disclosure of Japanese Patent Application No. 2008-262776 filed on Oct. 9, 2008 including specification, claims and summary is incorporated herein by reference in its entirety.

What is claimed is:

1. An aqueous coating composition comprising a fluoro-olefin copolymer, a pigment, the following copolymer (1) and an aqueous medium:
   Copolymer (1): an A-B type block copolymer which is a copolymer having no fluorine atoms or ionic groups and which comprises hydrophilic blocks (A) having repeating units (a) having a polyoxyethylene chain in the side chain, and hydrophobic blocks (B) having repeating units (b) having a hydrocarbon chain in the side chain.

2. The aqueous coating composition according to claim 1, wherein the copolymer (1) contains, based on all repeating units, from 20 to 80 mol % of the repeating units (a) and from 80 to 20 mol % of the repeating units (b), and from 80 to 100 mol % of such repeating units (a) are present in the hydrophilic blocks (A).

3. The aqueous coating composition according to claim 1, wherein the repeating units (a) have, in the side chain, —$(OC_2H_4)_nOR^1$ [wherein n is an integer of from 2 to 30, and $R^1$ is a hydrogen atom or a $C_{1-3}$ monovalent hydrocarbon group].

4. The aqueous coating composition according to claim 3, wherein the repeating units (a) are polymerized units based on $CH_2$=$C(X)$-$Q^1$-$(OC_2H_4)_nOR^1$
   [wherein n and $R^1$ are as defined above, X is a hydrogen atom or a methyl group, and $Q^1$ is a carbonyl group, —$COOR^3$— (provided that the carbonyl group in —$COOR^3$— is bonded to the carbon atom to which X is bonded, and $R^3$ is a $C_{3-6}$ alkylene group) or a single bond].

5. The aqueous coating composition according to claim 1, wherein the repeating units (b) are polymerized units based on $CH_2$=$C(X)$-$Q^2$-$R^2$
   [wherein $R^2$ is a $C_{1-20}$ hydrocarbon group, X is a hydrogen atom or a methyl group, and $Q^2$ is —COO— (provided that the carbonyl group in —COO— is bonded to the carbon atom to which X is bonded), a single bond or an oxygen atom].

6. The aqueous coating composition according to claim 1, wherein the content of the copolymer (1) is from 2 to 20 parts by mass per 100 parts by mass of the pigment contained in the aqueous coating composition.

7. The aqueous coating composition according to claim 1, wherein the fluoro-olefin copolymer has an acid group which may form a salt.

8. The aqueous coating composition according to claim 7, wherein the acid group is a carboxy group and/or a carboxylate group.

9. The aqueous coating composition according to claim 1, wherein the amount of an organic solvent is not higher than 1 mass % based on the total mass of the aqueous coating composition.

10. The aqueous coating composition according to claim 1, which contains no emulsifier.

11. The aqueous coating composition according to claim 1, which is for top coating.

12. The aqueous coating composition according to claim 1, wherein the content of the pigment is from 20 to 200 parts by mass per 100 parts by mass of the fluoro-olefin copolymer.

13. The aqueous coating composition according to claim 1, wherein the fluoro-olefin copolymer is a copolymer having the following units (f), the following units (g), the following units (h) and the following units (i):
   Units (f): repeating units based on a fluoro-olefin,
   Units (g): repeating units based on a vinyl monomer, an allyl monomer or an isopropenyl monomer and having, bonded thereto, carboxylate groups, some of which may be in the form of carboxy groups,
   Units (h): repeating units based on a vinyl monomer, an allyl monomer or an isopropenyl monomer and having, bonded thereto, no carboxy groups which may form hydroxy groups or salts,
   Units (i): repeating units based on a vinyl monomer having a hydroxy group bonded thereto, an allyl monomer having a hydroxy group bonded thereto or an isopropenyl monomer having a hydroxy group bonded thereto and having, bonded thereto, no carboxy groups which may form salts.

14. A process for producing the aqueous coating composition as defined in claim 1, which comprises a step of producing a fluoro-olefin copolymer aqueous dispersion by obtaining the fluoro-olefin copolymer by a solution polymerization using an organic solvent, and dissolving and/or dispersing the fluoro-olefin copolymer in an aqueous medium; a step of producing a pigment aqueous dispersion by dissolving and/or dispersing a pigment and the copolymer (1) in an aqueous medium; and a step of mixing the fluoro-olefin copolymer aqueous dispersion and the pigment aqueous dispersion.

15. A process for forming a coating film, which comprises a step of blending the aqueous coating composition as defined in claim 1 with a water-soluble or water-dispersible curing agent to obtain an aqueous coating material, and a step of applying the aqueous coating material to a surface of a substrate.

* * * * *